United States Patent
Seah

(10) Patent No.: US 8,963,742 B1
(45) Date of Patent: *Feb. 24, 2015

(54) HEAD-UP DISPLAY/SYNTHETIC VISION SYSTEM PREDICTED FLIGHT PATH DEPICTION

(75) Inventor: Kirschen A. Seah, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 325 days.

This patent is subject to a terminal disclaimer.

(21) Appl. No.: 13/310,066

(22) Filed: Dec. 2, 2011

Related U.S. Application Data

(63) Continuation of application No. 12/157,429, filed on Jun. 9, 2008, now Pat. No. 8,089,375.

(51) Int. Cl.
*G01C 21/00* (2006.01)
(52) U.S. Cl.
USPC ......... 340/971; 340/995.19; 340/979; 701/14
(58) Field of Classification Search
USPC ......... 340/971, 973, 980, 995.1, 995.19, 945, 340/979, 975, 974; 701/14, 209, 210
See application file for complete search history.

(56) References Cited

U.S. PATENT DOCUMENTS

| | | | |
|---|---|---|---|
| 5,051,735 A | | 9/1991 | Furukawa |
| 5,745,054 A | * | 4/1998 | Wilkens .................. 340/972 |
| 5,892,462 A | * | 4/1999 | Tran ........................ 340/961 |
| 6,870,490 B2 | | 3/2005 | Sherry et al. |
| 6,879,886 B2 | | 4/2005 | Wilkins, Jr. et al. |
| 6,972,696 B2 | | 12/2005 | Rogers et al. |
| 7,010,398 B2 | | 3/2006 | Wilkins, Jr. et al. |
| 7,030,780 B2 | | 4/2006 | Shiomi et al. |
| 7,656,313 B2 | | 2/2010 | Victor et al. |
| 8,049,644 B1 | * | 11/2011 | Oehlert et al. ............. 340/970 |
| 8,089,375 B1 | * | 1/2012 | Seah ........................ 340/971 |

* cited by examiner

*Primary Examiner* — Anh V La
(74) *Attorney, Agent, or Firm* — Angel N. Gerdzhikov; Donna P. Suchy; Daniel M. Barbieri

(57) ABSTRACT

A head-up display system includes an aircraft, a predicted flight path generation component that calculates a predicted flight path over a period of time, and a graphic generation component configured to generate a graphical display and project it onto a combiner configured to combine the graphical display with a visual exterior view. A synthetic vision system includes an aircraft, a predicted flight path generation component that receives one or more state parameters and calculates a predicted flight path over a period of time, and a synthetic terrain generation component configured to generate a synthetic view which is displayed on a display. The graphical display and/or the synthetic view includes a three-dimensional depiction of the predicted flight path over the period of time generated utilizing one or more three-dimensional transforms, one or more graphical images based on flight data, and a three-dimensional graphical depiction of a flight plan.

15 Claims, 6 Drawing Sheets

HEAD-UP DISPLAY/SYNTHETIC VISION SYSTEM PREDICTED FLIGHT PATH DEPICTION

CROSS REFERENCE TO RELATED APPLICATIONS

The present application is a continuation of U.S. patent application Ser. No. 12/157,429 filed Jun. 9, 2008, pending, and claims priority to U.S. patent application Ser. No. 12/157,429 under 35 U.S.C. §120. Said U.S. patent application Ser. No. 12/157,429 is hereby incorporated by reference in its entirety.

TECHNICAL FIELD

The present disclosure generally relates to the field of guidance systems, and more particularly to a predicted flight path depiction for a head-up display and/or a synthetic vision system.

BACKGROUND

Situational awareness concerns the knowledge and understanding of an environment critical complex decision making in areas such as aviation. Situational awareness involves the perception of elements in the environment within a volume of time and space, the comprehension of their meaning, and the projection of their status in the near future. At its core, situation awareness involves being aware of what is happening to understand how information, events, and actions will impact goals and objectives, both now and in the near future.

Head-up displays and synthetic vision systems have been developed to improve situational awareness in aviation. A head-up display (HUD) is a transparent display that presents data without obstructing a user's view of a scene external to the transparent display. A synthetic vision system typically utilizes a set of databases (including, but not limited to terrain, obstacle, geo-political, and/or hydrological databases) and an image generator to render a synthetic view on a display. Head-up displays and/or synthetic vision systems may display a Highway In The Sky (or Path-In-The-Sky), or a the intended flight plan of the aircraft graphically depicted three-dimensionally (typically in perspective view). Head-up displays and/or synthetic vision systems may include a flight path vector symbol, or an indicator that graphically depicts the trajectory of the aircraft at the current point in time.

SUMMARY

A head-up display system for displaying a predicted flight path depiction may include an aircraft, a predicted flight path generation component, a graphic generation component, a combiner, and one or more sensors. The graphic generation component may be configured to generate a graphical display which is projected onto the combiner. The combiner may be configured to combine the graphical display with a visual exterior view of a scene external to the aircraft. The one or more sensors may detect information about one or more state parameters of the present position of the aircraft. The predicted flight path generation component may receive one or more state parameters and calculate a predicted flight path for the aircraft over a period of time based on the one or more state parameters and one or more flight dynamics equations. The graphic generation component may be configured to generate the graphical display including a three-dimensional depiction of the predicted flight path for the aircraft over the period of time generated utilizing one or more three-dimensional transforms. The head-up display system may also include a flight data receiver configured to receive flight data for the aircraft. The graphic generation component may be configured to generate the graphical display including one or more graphical images based on flight data received by the flight data receiver. The flight data may include a flight plan for the aircraft. The graphic generation component may be configured to generate the graphical display including a three-dimensional graphical depiction of the flight plan for the aircraft.

A synthetic vision system for displaying a predicted flight path depiction may include an aircraft, a predicted flight path generation component, a synthetic terrain generation component, a display, and one or more sensors. The synthetic terrain generation component may be configured to generate a synthetic view which is displayed on the display. The synthetic terrain generation component may be configured to generate (or render) a synthetic view utilizing data from one or more databases including, but not limited to a terrain database, an obstacle database, a geo-political database, and/or a hydrological database. The one or more sensors may detect information about one or more state parameters of the present position of the aircraft. The predicted flight path generation component may receive one or more state parameters and calculate a predicted flight path for the aircraft over a period of time based on the one or more state parameters and one or more flight dynamics equations. The synthetic terrain generation component may be configured to generate the synthetic view including a three-dimensional depiction of the predicted flight path for the aircraft over the period of time generated utilizing one or more three-dimensional transforms. The synthetic vision system may also include a flight data receiver configured to receive flight data for the aircraft. The synthetic view generation component may be configured to generate the synthetic view including one or more graphical images based on flight data received by the flight data receiver. The flight data may include a flight plan for the aircraft. The synthetic view generation component may be configured to generate the synthetic view including a three-dimensional graphical depiction of the flight plan for the aircraft.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

On a head-up display and/or a synthetic vision system, a flight path vector symbol graphically depicts the trajectory of the aircraft at the current point in time. The flight path vector symbol does not depict the trajectory of the aircraft at any point in time other than the current time. It may be useful to provide an indicator on a head-up display and/or a synthetic vision system which depicts the trajectory of the aircraft over a period of time including, but not limited to, ten seconds from the current time, thirty seconds from the current time, and/or one minute from the current time. In this way, a user of the head-up display and/or synthetic vision system is able to discover what the trajectory of the aircraft may be over the period of time rather than merely discover the trajectory of the aircraft at the current time.

Figure 1:
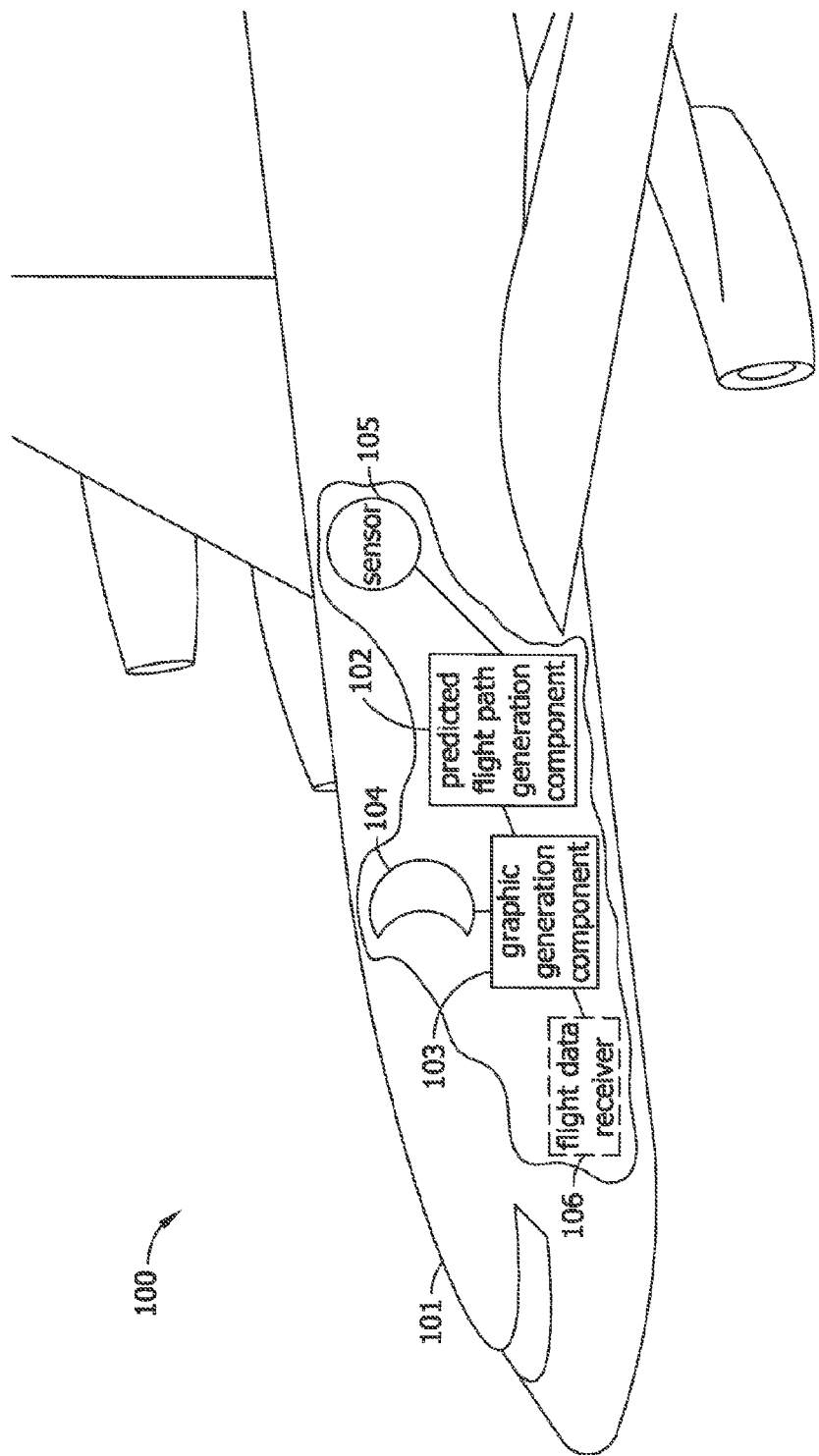
FIG. 1 is a diagram illustrating a head-up display system for displaying a predicted flight path depiction, in accordance with an embodiment of the present disclosure.

FIG. 1 illustrates a head-up display system 100 for displaying a predicted flight path depiction, in accordance with an embodiment of the present disclosure. The head-up display system 100 may include an aircraft 101, a predicted flight path generation component 102, a graphic generation component 103, a combiner 104, and one or more sensors 105. The graphic generation component 103 may be configured to generate a graphical display which is projected onto the combiner 104. The graphic generation component 103 may comprise a computing device including a processor for generating the graphical display. The graphical display may be projected onto the combiner 104 utilizing any projection technology including, but not limited to, a cathode-ray tube display and/or a liquid crystal display. The combiner 104 may be configured to combine the graphical display with a visual exterior view of a scene external to the aircraft 101 (for example, through a cockpit window of the aircraft 101). The combiner 104 may be configured to combine the graphical display with a visual exterior view of a scene external to the aircraft 101 by being configured to reflect a wavelength of light of the graphical display but passing other wavelengths. The graphical display may be projected at infinity such that a user does not have to refocus between the graphical display projected onto the combiner 104 and the visual exterior view of the scene external to the aircraft 101.

The one or more sensors 105 may detect information about one or more state parameters of the present position of the aircraft 101. The one or more state parameters may include, but are not limited to, state parameters such as the airspeed of the aircraft 101, the rate of change of the airspeed of the aircraft 101, the acceleration of the airspeed of the aircraft 101, the pitch of the aircraft 101, the rate of change of the pitch of the aircraft 101, the acceleration of the pitch of the aircraft 101, the roll of the aircraft 101, the rate of change of the roll of the aircraft 101, the acceleration of the roll of the aircraft 101, the yaw of the aircraft 101, the rate of change of the yaw of the aircraft 101, the acceleration of the yaw of the aircraft 101, the heading of the aircraft 101, the rate of change of the heading of the aircraft 101, the acceleration of the heading of the aircraft 101, the angle of attack of the aircraft 101, the rate of change of the angle of attack of the aircraft 101, the acceleration of the angle of attack of the aircraft 101, the slip of the aircraft 101, the rate of change of the slip of the aircraft 101, and/or the acceleration of the slip of the aircraft 101. The predicted flight path generation component 102 may receive one or more state parameters and calculate a predicted flight path for the aircraft 101 over a period of time (including, but not limited to, five seconds from a current time, twenty-five seconds from the current time, and/or two minutes from the current time) based on the one or more state parameters and one or more flight dynamics equations (including, but not limited to, longitudinal equations of motion, small perturbation equations of motion, yaw plane translation equations, lateral equations product of inertia, lateral stability equations, and/or roll rate equations). The predicted flight path generation component 102 may comprise a computing device including a processor for calculating the predicted flight path for the aircraft 101 over the period of time. The graphic generation component 103 may be configured to generate the graphical display including a three-dimensional depiction of the predicted flight path for the aircraft 101 over the period of time. To generate the graphical display including a three-dimensional depiction of the predicted flight path for the aircraft 101 over the period of time, the graphic generation component 103 may receive the predicted flight path from the predicted flight path generation component 102 and utilize one or more three-dimensional transforms (including, but not limited to a Fourier transform, an orthographic projection transform, a perspective projection transform, a rotation transformation, a scaling transformation, a reflection transformation, and/or a orthogonal projection transformation) to generate a three-dimensional depiction of the predicted flight path.

For example, the instantaneous velocities of the aircraft 101 in the aircraft centric orthogonal axes (X along the velocity vector, Y out the right wing, and Z out the underside of the aircraft) may be utilized to derive an instantaneous velocity for the aircraft 101 in the three dimensions. Then, the aircraft 101 position for future points in time may be predictively computed utilizing the instantaneous velocity for the aircraft 101 in the three dimensions. The future position ten seconds from the present time may be computed, as well as the future position ten seconds from that and so on for the duration of the period of time of the predicted flight path. The predicted velocities ($1^{st}$ order derivatives) may be computed utilizing $2^{nd}$ order derivatives (accelerations) of the aircraft 101 state (including, but not limited to, X, Y, Z, pitch, roll, and/or yaw) at each of the future time points and may be utilized to refine predicted position at these time points. Once the X, Y, and Z coordinates of each of the positions have been predicted, the coordinates may be projected to an earth centered coordinate system utilizing geodetic datum (such as WGS84) and thence to a graphics coordinate system in order to generate the three-dimensional depiction of the predicted flight path to project onto the combiner 104.

The head-up display system 100 may also include a flight data receiver 106 configured to receive flight data for the aircraft 101. The flight data may include, but is not limited to, an airspeed of the aircraft 101, a heading of the aircraft 101, a yaw of the aircraft 101, a roll of the aircraft 101, a slip of the aircraft 101, an engine temperature of the aircraft 101, a fuel level of the aircraft 101, and/or other data related to the flight of the aircraft 101. The graphic generation component 103 may be configured to generate the graphical display including one or more graphical images based on flight data received by the flight data receiver 101. The flight data may include a flight plan for the aircraft 101. The graphic generation component 103 may be configured to generate the graphical display including a three-dimensional graphical depiction of the flight plan for the aircraft 101 (such as a Highway In The Sky or a Path-In-The-Sky).

Figure 2:
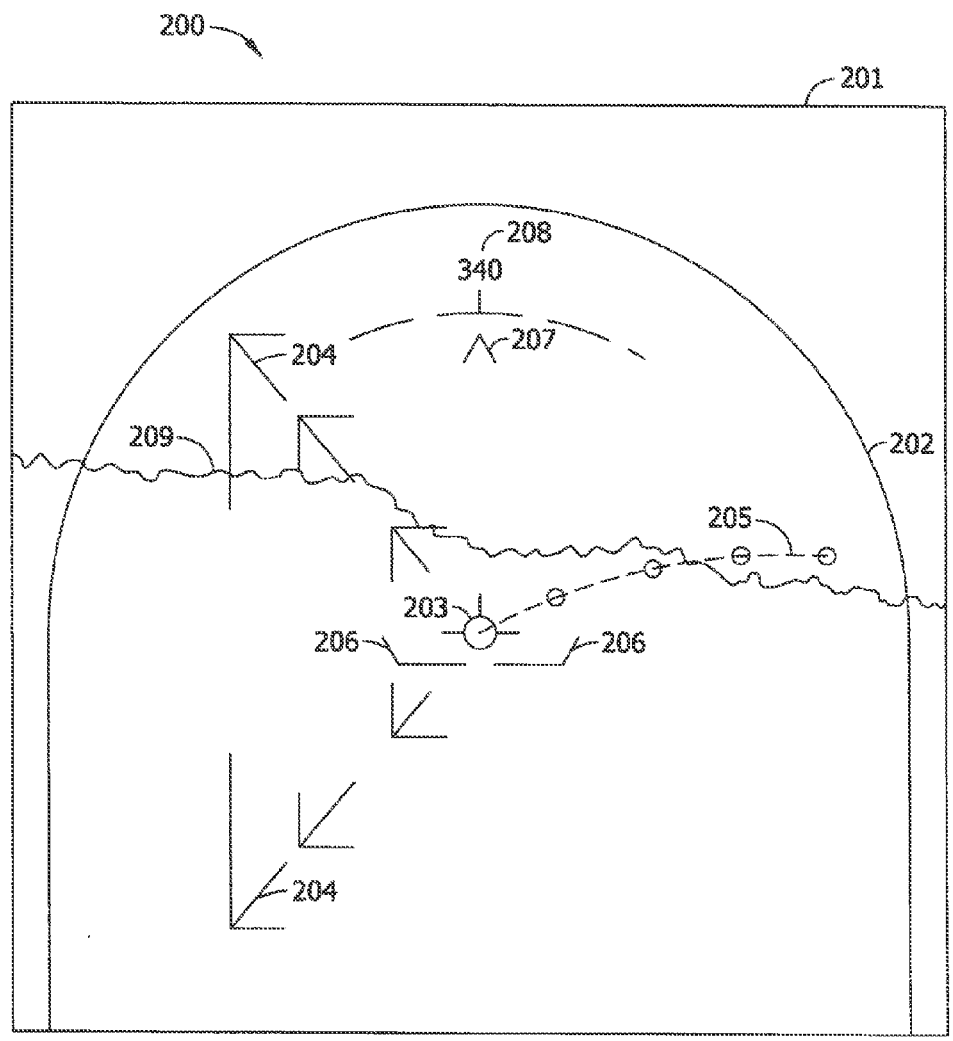
FIG. 2 is a diagram illustrating a head-up display that may be utilized in the system of FIG. 1, in accordance with an embodiment of the present disclosure.

FIG. 2 illustrates an example of a head-up display 200 that may be utilized in the head-up display system 100, in accordance with an embodiment of the present disclosure. The head-up display 200 may include a graphical display (203-208) combined with a visual exterior view of a scene 209 external to the aircraft 101. In this example, the visual exterior view of a scene 209 external to the aircraft 101 comprises a view visible through a window 201 of the aircraft 101 and/or a combiner 202. The combiner 202 may combine the graphical display (203-208) projected onto the combiner 202 with the visual exterior view of a scene 209 external to the aircraft 101. The graphical display (203-208) may include one or more graphical images based on flight data of the aircraft 101 including, but not limited to, flight path vector 203, horizon indicator 206, boresight indicator 207, a slip/skid indicator (indicated by the horizontal relationship between flight path vector indicator 203 and horizon indicator 206), an acceleration indicator (not shown), and/or heading indicator 208. The graphical display (203-208) may also include a three-dimensional graphical depiction of the flight plan for the aircraft 101 (such as a Highway In The Sky or a Path-In-The-Sky) represented by flight plan indicator 204. The graphical display (203-208) may also include a three-dimensional depiction of the predicted flight path for the aircraft 101 over the period of time represented by predicted flight path indicator 205. As can be seen from FIG. 2, the current trajectory of the aircraft 101 indicated by the flight path vector indicator 203 is in keeping with the flight plan indicated by the flight plan indicator 204. However, the trajectory of the aircraft 101 over the period of time indicated by the predicted flight path indicator 205, calculated based on the state parameters of the aircraft 101, deviates from the flight plan indicated by the flight plan indicator 204. A user of the aircraft 101 may be able to take corrective action based on a comparison of the flight plan indicator 204 and the predicted flight path indicator 205 so that the aircraft 101 will remain on the planned flight path.

Figure 3:
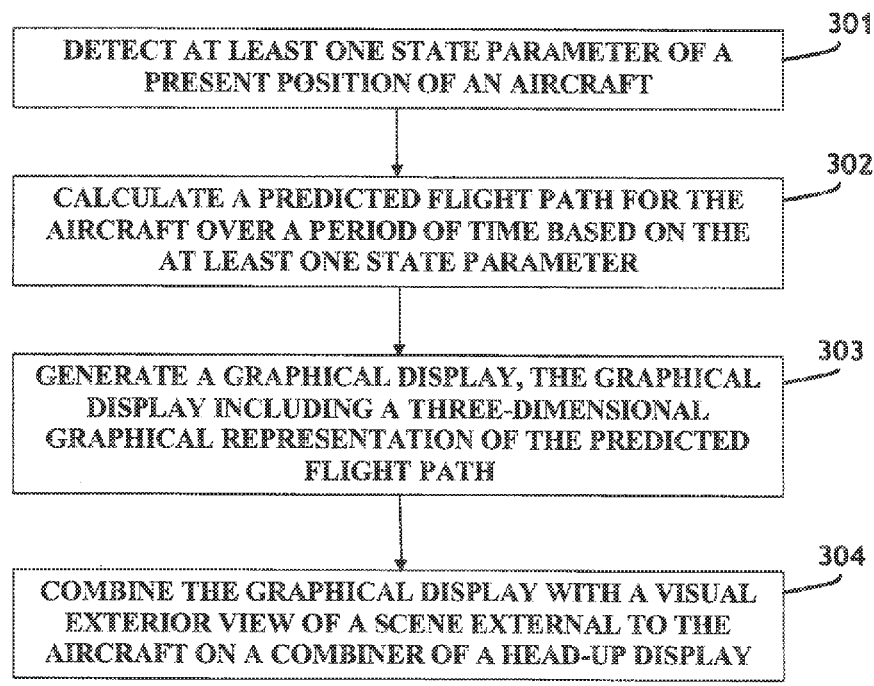
FIG. 3 is flow chart illustrating a method for displaying a predicted flight path depiction on a head-up display, in accordance with an embodiment of the present disclosure.

FIG. 3 illustrates a method 300 for displaying a predicted flight path depiction on a head-up display, in accordance with an embodiment of the present disclosure. In step 301, detect at least one state parameter of a present position of an aircraft. Detecting at least one state parameter of a present position of an aircraft may include detecting at least one of an airspeed of the aircraft, a rate of change of the airspeed of the aircraft, an acceleration of the airspeed of the aircraft, a pitch of the aircraft, a rate of change of the pitch of the aircraft, an acceleration of the pitch of the aircraft, a roll of the aircraft, a rate of change of the roll of the aircraft, an acceleration of the roll of the aircraft, a yaw of the aircraft, a rate of change of the yaw of the aircraft, an acceleration of the yaw of the aircraft, a heading of the aircraft, a rate of change of the heading of the aircraft, an acceleration of the heading of the aircraft, an angle of attack of the aircraft, a rate of change of the angle of attack of the aircraft, an acceleration of the angle of attack of the aircraft, a slip of the aircraft, a rate of change of the slip of the aircraft, and/or an acceleration of the slip of the aircraft. In step 302, calculate a predicted flight path for the aircraft over a period of time based on the at least one state parameter. In step 303, generate a graphical display, the graphical display including a three-dimensional graphical representation of the predicted flight path. Generating a graphical display may include generating a graphical display including at least one graphical image based on flight data received for the aircraft. Generating a graphical display may include generating a graphical display including the three-dimensional graphical representation of the predicted flight path by performing at least one three-dimensional graphic transform on the predicted flight path. Generating a graphical display may include generating a graphical display including a three-dimensional representation of a flight plan of the aircraft. In step 304, combine the graphical display with a visual exterior view of a scene external to the aircraft on a combiner of a head-up display.

Figure 4:
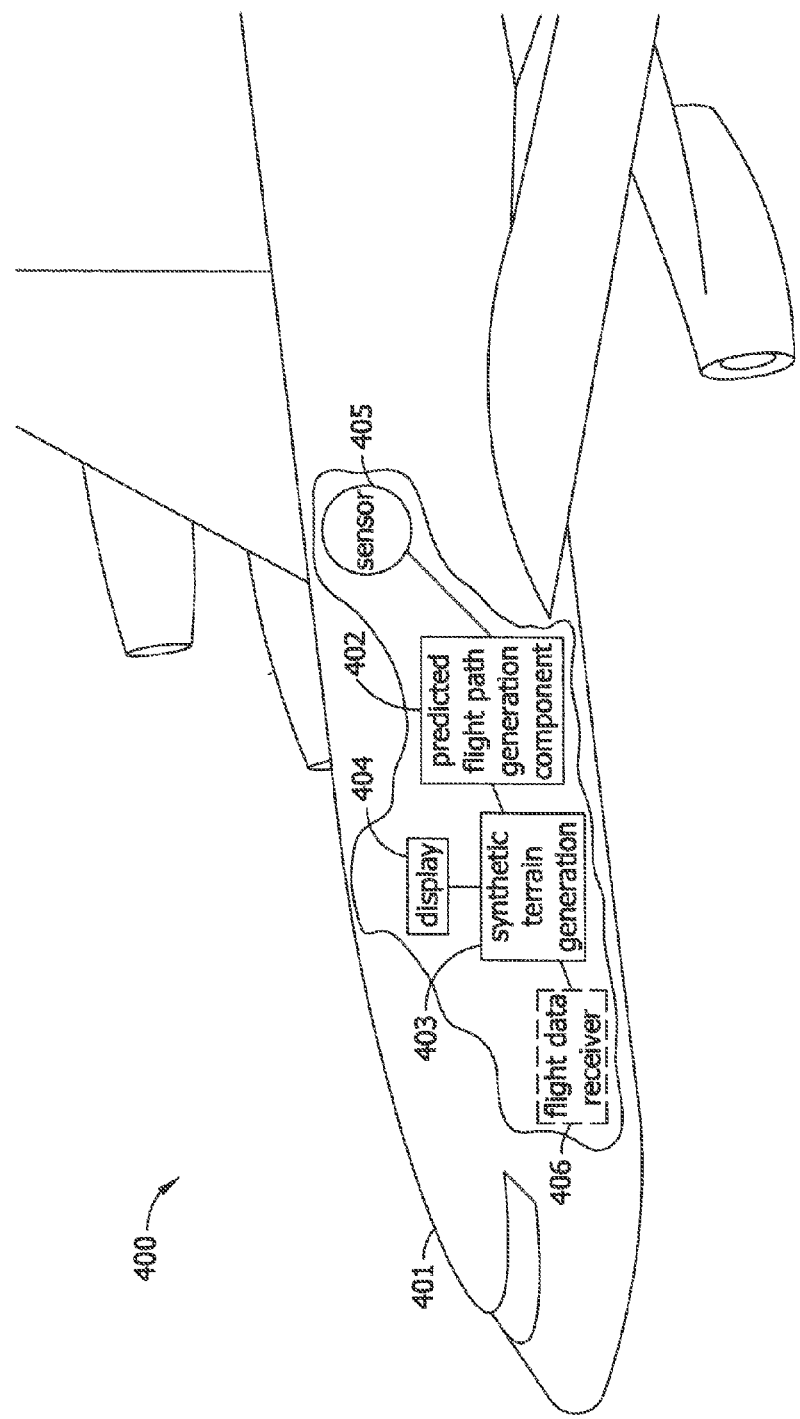
FIG. 4 is a diagram illustrating a synthetic vision system for displaying a predicted flight path depiction, in accordance with an alternative embodiment of the present disclosure.

FIG. 4 illustrates a synthetic vision system 400 for displaying a predicted flight path depiction, in accordance with an alternative embodiment of the present disclosure. The synthetic vision system 400 may include an aircraft 401, a predicted flight path generation component 402, a synthetic terrain generation component 403, a display 404, and one or more sensors 405. The synthetic terrain generation component 403 may be configured to generate a synthetic view which is displayed on the display 404. The synthetic terrain generation component 403 may comprise a computing device including a processor for generating the synthetic view. The synthetic terrain generation component 403 may be configured to generate (or render) a synthetic view utilizing data from one or more databases including, but not limited to a terrain database, an obstacle database, a geo-political database, and/or a hydrological database. The display 404 may comprise any display technology including, but not limited to, a cathode-ray tube display and/or a liquid crystal display.

The one or more sensors 405 may detect information about one or more state parameters of the present position of the aircraft 401. The one or more state parameters may include, but are not limited to, state parameters such as the airspeed of the aircraft 401, the rate of change of the airspeed of the aircraft 401, the acceleration of the airspeed of the aircraft 401, the pitch of the aircraft 401, the rate of change of the pitch of the aircraft 401, the acceleration of the pitch of the aircraft 401, the roll of the aircraft 401, the rate of change of the roll of the aircraft 401, the acceleration of the roll of the aircraft 401, the yaw of the aircraft 401, the rate of change of the yaw of the aircraft 401, the acceleration of the yaw of the aircraft 401, the heading of the aircraft 401, the rate of change of the heading of the aircraft 401, the acceleration of the heading of the aircraft 401, the angle of attack of the aircraft 401, the rate of change of the angle of attack of the aircraft 401, the acceleration of the angle of attack of the aircraft 401, the slip of the aircraft 401, the rate of change of the slip of the aircraft 401, and/or the acceleration of the slip of the aircraft 401. The predicted flight path generation component 402 may receive one or more state parameters and calculate a predicted flight path for the aircraft 401 over a period of time (including, but not limited to, five seconds from a current time, twenty-five seconds from the current time, and/or two minutes from the current time) based on the one or more state parameters and one or more flight dynamics equations (including, but not limited to, longitudinal equations of motion, small perturbation equations of motion, yaw plane translation equations, lateral equations product of inertia, lateral stability equations, and/or roll rate equations). The predicted flight path generation component 402 may comprise a computing device including a processor for calculating the predicted flight path for the aircraft 401 over the period of time. The synthetic terrain generation component 403 may be configured to generate the synthetic view including a three-dimensional depiction of the predicted flight path for the aircraft 401 over the period of time. To generate the synthetic view including a three-dimensional depiction of the predicted flight path for the aircraft 401 over the period of time, the graphic generation component 403 may receive the predicted flight path from the predicted flight path generation component 402 and utilize one or more three-dimensional transforms (including, but not limited to a Fourier transform, an orthographic projection transform, a perspective projection transform, a rotation transformation, a scaling transformation, a reflection transformation, and/or a orthogonal projection transformation) to generate a three-dimensional depiction of the predicted flight path.

For example, the instantaneous velocities of the aircraft 401 in the aircraft centric orthogonal axes (X along the velocity vector, Y out the right wing, and Z out the underside of the aircraft) may be utilized to derive an instantaneous velocity for the aircraft 401 in the three dimensions. Then, the aircraft 401 position for future points in time may be predictively computed utilizing the instantaneous velocity for the aircraft 401 in the three dimensions. The future position ten seconds from the present time may be computed, as well as the future position ten seconds from that and so on for the duration of the period of time of the predicted flight path. The predicted velocities ($1^{st}$ order derivatives) may be computed utilizing $2^{nd}$ order derivatives (accelerations) of the aircraft 401 state (including, but not limited to, X, Y, Z, pitch, roll, and/or yaw) at each of the future time points and may be utilized to refine predicted position at these time points. Once the X, Y, and Z coordinates of each of the positions have been predicted, the coordinates may be projected to an earth centered coordinate system utilizing geodetic datum (such as WGS84) and thence to a graphics coordinate system in order to generate the three-dimensional depiction of the predicted flight path to display on the display 404.

The synthetic vision system 400 may also include a flight data receiver 406 configured to receive flight data for the aircraft 401. The flight data may include, but is not limited to, an airspeed of the aircraft 401, a heading of the aircraft 401, a yaw of the aircraft 401, a roll of the aircraft 401, a slip of the aircraft 401, an engine temperature of the aircraft 401, a fuel level of the aircraft 401, and/or other data related to the flight of the aircraft 401. The synthetic view generation component 403 may be configured to generate the synthetic view including one or more graphical images based on flight data received by the flight data receiver 401. The flight data may include a flight plan for the aircraft 401. The synthetic view generation component 403 may be configured to generate the synthetic view including a three-dimensional graphical depiction of the flight plan for the aircraft 401 (such as a Highway In The Sky or a Path-In-The-Sky).

Figure 5:
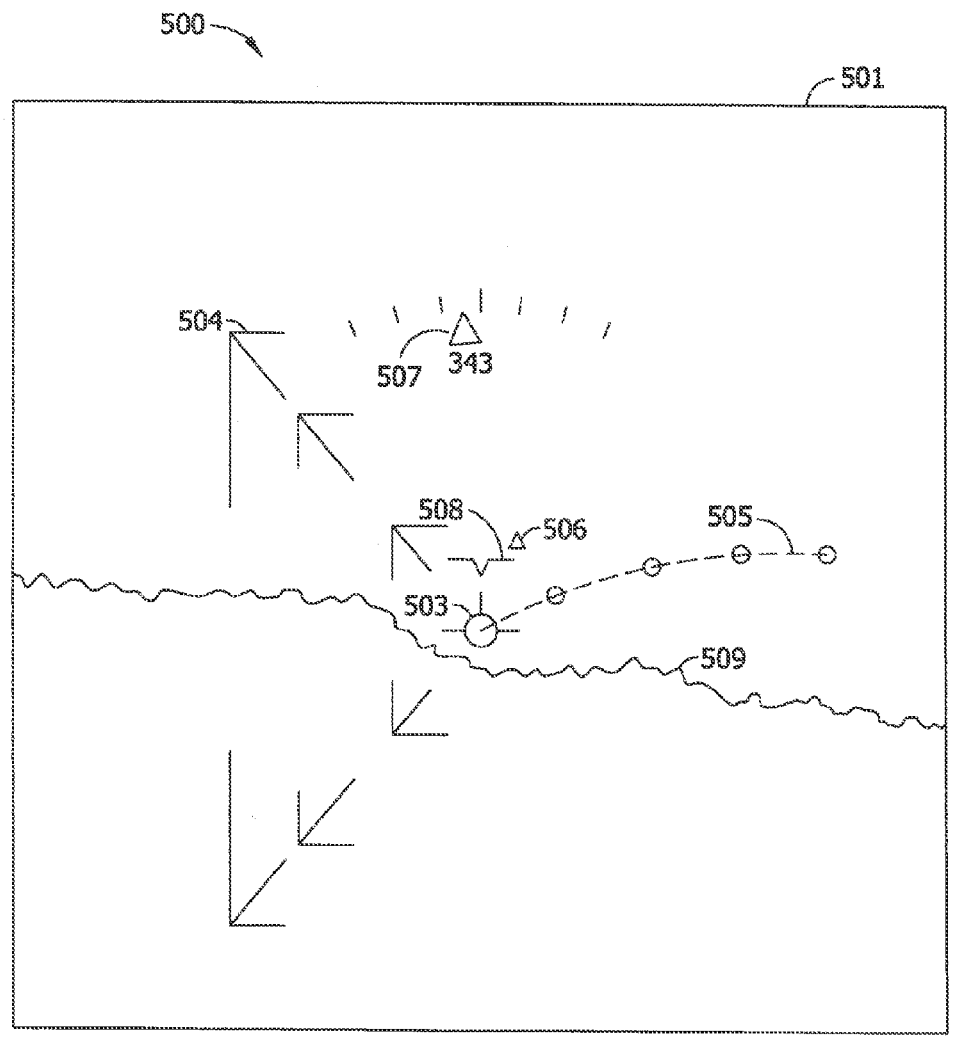
FIG. 5 is a diagram illustrating a synthetic vision display that may be utilized in the system of FIG. 4, in accordance with an embodiment of the present disclosure.

FIG. 5 illustrates an example of a synthetic view 501 that may be utilized in the synthetic vision system 400, in accordance with an embodiment of the present disclosure. The synthetic view 501 may include a graphical elements (503-508) combined with a synthetic terrain 509. The graphical elements (503-508) may include one or more graphical images based on flight data of the aircraft 401 including, but not limited to, flight path vector 503, horizon indicator 508, boresight indicator 507, a slip/skid indicator 506, an acceleration indicator (indicated by the relationship between horizon indicator 508 and slip/skid indicator 506), and/or heading indicator 507. The graphical elements (503-508) may also include a three-dimensional graphical depiction of the flight plan for the aircraft 401 (such as a Highway In The Sky or a Path-In-The-Sky) represented by flight plan indicator 504. The graphical elements (503-508) may also include a three-dimensional depiction of the predicted flight path for the aircraft 401 over the period of time represented by predicted flight path indicator 505. As can be seen from FIG. 5, the current trajectory of the aircraft 401 indicated by the flight path vector indicator 503 is in keeping with the flight plan indicated by the flight plan indicator 504. However, the trajectory of the aircraft 401 over the period of time indicated by the predicted flight path indicator 505, calculated based on the state parameters of the aircraft 401, deviates from the flight plan indicated by the flight plan indicator 504. A user of the aircraft 401 may be able to take corrective action based on a comparison of the flight plan indicator 504 and the predicted flight path indicator 505 so that the aircraft 401 will remain on the planned flight path.

Figure 6:
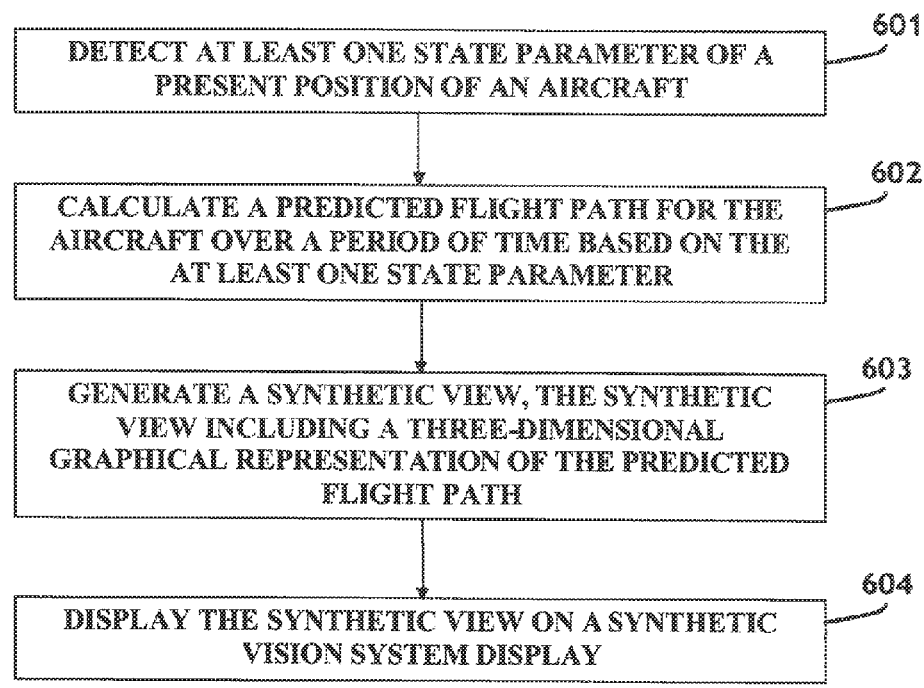
FIG. 6 is a flow diagram illustrating a method for displaying a predicted flight path depiction on a synthetic vision system, in accordance with an embodiment of the present disclosure.

FIG. 6 illustrates a method 600 for displaying a predicted flight path depiction on a synthetic vision system, in accordance with an embodiment of the present disclosure. In step 601, detect at least one state parameter of a present position of an aircraft. Detecting at least one state parameter of a present position of an aircraft may include detecting at least one of an airspeed of the aircraft, a rate of change of the airspeed of the aircraft, an acceleration of the airspeed of the aircraft, a pitch of the aircraft, a rate of change of the pitch of the aircraft, an acceleration of the pitch of the aircraft, a roll of the aircraft, a rate of change of the roll of the aircraft, an acceleration of the roll of the aircraft, a yaw of the aircraft, a rate of change of the yaw of the aircraft, an acceleration of the yaw of the aircraft, a heading of the aircraft, a rate of change of the heading of the aircraft, an acceleration of the heading of the aircraft, an angle of attack of the aircraft, a rate of change of the angle of attack of the aircraft, an acceleration of the angle of attack of the aircraft, a slip of the aircraft, a rate of change of the slip of the aircraft, and/or an acceleration of the slip of the aircraft. In step 602, calculate a predicted flight path for the aircraft over a period of time based on the at least one state parameter. In step 603, generate a synthetic view, the synthetic view including a three-dimensional graphical representation of the predicted flight path. Generating a synthetic view may include generating a synthetic view including at least one graphical image based on flight data received for the aircraft. Generating a synthetic view may include generating a synthetic view including the three-dimensional graphical representation of the predicted flight path by performing at least one three-dimensional graphic transform on the predicted flight path. Generating a synthetic view may include generating a synthetic view including a three-dimensional representation of a flight plan of the aircraft. In step 604, display the synthetic view on a synthetic vision system display.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
an aircraft, including at least one sensor configured to detect information about at least one state parameter of a present position of the aircraft;
a head-up display, comprising:
a predicted flight path generation component, the predicted flight path generation component configured to receive the at least one state parameter and calculate a predicted trajectory for the aircraft over a period of time based on the at least one state parameter;
a graphic generation component, the graphic generation component configured to generate a graphical display; and
a combiner, the combiner configured to combine the graphical display with a visual exterior view of a scene external to the aircraft,
wherein the graphical display includes a three-dimensional graphical representation of the predicted trajectory and the predicted trajectory includes one or more predicted locations for the aircraft at one or more future times different than a current time at which the predicted trajectory is displayed, the at least one state parameter of the present position of the aircraft includes a second order derivative of a state of the aircraft and the predicted trajectory for the aircraft over a period of time based on the at least one state parameter, the predicted flight path generation component uses a predicted first order derivative of the state of the aircraft based upon the second order derivative to refine the one or more predicted locations for the aircraft at the one or more future times.

2. The system of claim 1, wherein the head-up display further comprises a flight data receiver configured to receive flight data for the aircraft and the graphical display includes at least one graphical image based on the flight data.

3. The system of claim 1, wherein the graphic generation component generates the three-dimensional graphical representation of the predicted trajectory by at least one three-dimensional graphic transform on the predicted trajectory.

4. The system of claim 1, wherein the at least one state parameter includes at least one of an airspeed of the aircraft, a pitch of the aircraft, a roll of the aircraft, a yaw of the aircraft, a heading of the aircraft, an angle of attack of the aircraft, or a slip of the aircraft.

5. The system of claim 1, wherein the graphical display includes a three-dimensional graphical representation of a flight plan of the aircraft.

6. A system, comprising:
an aircraft, including at least one sensor configured to detect information about at least one state parameter of a present position of the aircraft;
a synthetic vision system, comprising:
a predicted flight path generation component, the predicted flight path generation component configured to receive the at least one state parameter and calculate a predicted trajectory for the aircraft over a period of time based on the at least one state parameter;
a synthetic terrain generation component, the synthetic terrain generation component configured to generate a synthetic view; and
a display, the display configured to display the synthetic view, wherein the synthetic view includes a three-dimensional graphical representation of the predicted trajectory, and where the predicted trajectory includes one or more predicted locations for the aircraft at one or more future times different than a current time at which the predicted trajectory is displayed, the at least one state parameter of the present position of the aircraft includes a second order derivative of a state of the aircraft and the predicted trajectory for the aircraft over a period of time based on the at least one state parameter, the predicted flight path generation component uses a predicted first order derivative of the state of the aircraft based upon the second order derivative to refine the one or more predicted locations for the aircraft at the one or more of future times.

7. The system of claim 6, wherein the synthetic vision system further comprises a flight data receiver configured to receive flight data for the aircraft and the graphical display includes at least one graphical image based on the flight data.

8. The system of claim 6, wherein the synthetic terrain generation component generates the three-dimensional graphical representation of the predicted trajectory by at least one three-dimensional graphic transform on the predicted trajectory.

9. The system of claim 6, wherein the at least one state parameter includes at least one of an airspeed of the aircraft, a rate of change of the airspeed of the aircraft, an acceleration of the airspeed of the aircraft, a pitch of the aircraft, a rate of change of the pitch of the aircraft, an acceleration of the pitch of the aircraft, a roll of the aircraft, a rate of change of the roll of the aircraft, an acceleration of the roll of the aircraft, a yaw of the aircraft, a rate of change of the yaw of the aircraft, an acceleration of the yaw of the aircraft, a heading of the aircraft, a rate of change of the heading of the aircraft, an acceleration of the heading of the aircraft, an angle of attack of the aircraft, a rate of change of the angle of attack of the aircraft, an acceleration of the angle of attack of the aircraft, a slip of the aircraft, a rate of change of the slip of the aircraft, or an acceleration of the slip of the aircraft.

10. The system of claim 6, wherein the synthetic view includes a three-dimensional graphical representation of a flight plan of the aircraft.

11. A synthetic vision system, comprising:
a predicted flight path generation component, the predicted flight path generation component configured to receive at least one state parameter and calculate a predicted trajectory for an aircraft over a period of time based on the at least one state parameter;
a synthetic terrain generation component, the synthetic terrain generation component configured to generate a synthetic view; and
a display, the display configured to provide the synthetic view, wherein the synthetic view includes a three-dimensional graphical representation of the predicted trajectory, where the predicted trajectory includes one or more predicted locations for the aircraft at one or more future times different than a current time at which the predicted trajectory is provided, the at least one state parameter of a present position of the aircraft includes a second order derivative of a state of the aircraft and the predicted trajectory for the aircraft over a period of time based on the at least one state parameter, the predicted flight path generation component uses a predicted first order derivative of the state of the aircraft based upon the second order derivative to refine the one or more predicted locations for the aircraft at the one or more future times.

12. The system of claim 11, further comprising a flight data receiver configured to receive flight data for the aircraft and the synthetic view includes at least one graphical image based on the flight data.

13. The system of claim 11, wherein the synthetic terrain generation component generates the three-dimensional graphical representation of the predicted trajectory by at least one three-dimensional graphic transform on the predicted trajectory.

14. The system of claim 11, wherein the at least one state parameter includes at least one of an airspeed of the aircraft, a rate of change of the airspeed of the aircraft, an acceleration of the airspeed of the aircraft, a pitch of the aircraft, a rate of change of the pitch of the aircraft, an acceleration of the pitch of the aircraft, a roll of the aircraft, a rate of change of the roll of the aircraft, an acceleration of the roll of the aircraft, a yaw of the aircraft, a rate of change of the yaw of the aircraft, an acceleration of the yaw of the aircraft, a heading of the aircraft, a rate of change of the heading of the aircraft, an acceleration of the heading of the aircraft, an angle of attack of the aircraft, a rate of change of the angle of attack of the aircraft, an acceleration of the angle of attack of the aircraft, a slip of the aircraft, a rate of change of the slip of the aircraft, or an acceleration of the slip of the aircraft.

15. The system of claim 11, wherein the synthetic view includes a three-dimensional graphical representation of a flight plan of the aircraft.

\* \* \* \* \*